United States Patent
Liu et al.

(10) Patent No.: US 10,762,373 B2
(45) Date of Patent: Sep. 1, 2020

(54) IMAGE RECOGNITION METHOD AND DEVICE

(71) Applicant: Baidu Online Network Technology (Beijing) Co., Ltd, Beijing (CN)

(72) Inventors: Zhaoliang Liu, Beijing (CN); Yongjie Zhang, Beijing (CN); Hongwu Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 113 days.

(21) Appl. No.: 16/145,562

(22) Filed: Sep. 28, 2018

(65) Prior Publication Data

US 2019/0303700 A1 Oct. 3, 2019

(30) Foreign Application Priority Data

Mar. 30, 2018 (CN) .......................... 2018 1 0274877

(51) Int. Cl.
*G06K 9/00* (2006.01)
*G06K 9/32* (2006.01)
(Continued)

(52) U.S. Cl.
CPC ........... *G06K 9/3241* (2013.01); *G06F 16/51* (2019.01); *G06F 16/5838* (2019.01);
(Continued)

(58) Field of Classification Search
CPC combination set(s) only.
See application file for complete search history.

(56) References Cited

U.S. PATENT DOCUMENTS

| 2007/0098303 A1* | 5/2007 | Gallagher | G06F 16/583 |
| | | | 382/305 |
| 2013/0002828 A1* | 1/2013 | Ding | G02B 17/0836 |
| | | | 348/49 |

(Continued)

FOREIGN PATENT DOCUMENTS

| CN | 102194133 A | 9/2011 |
| CN | 102663391 A | 9/2012 |

(Continued)

OTHER PUBLICATIONS

Office Action issued in connection with corresponding Chinese Patent Application No. 201810274877.8.

(Continued)

*Primary Examiner* — Alex Kok S Liew
(74) *Attorney, Agent, or Firm* — Akerman LLP

(57) ABSTRACT

An image recognition method and device are provided according to the disclosure. The method includes: obtaining a target image, and extracting at least one first visual feature of the target image; obtaining at least one pending image according to the first visual feature of the target image, and extracting a plurality of second visual features of the target image and the plurality of second visual features of the pending image; for each pending image, forming a plurality of visual feature pairs; and removing an unavailable visual feature pair from the plurality of visual feature pairs, to obtain at least one remaining feature pair; and determining an image similar to the target image from the at least one pending image, according to the at least one remaining feature pair.

19 Claims, 5 Drawing Sheets

(51) Int. Cl.
*G06F 16/583* (2019.01)
*G06F 16/51* (2019.01)
*G06K 9/62* (2006.01)
*G06T 3/00* (2006.01)

(52) U.S. Cl.
CPC ....... *G06F 16/5854* (2019.01); *G06K 9/6215* (2013.01); *G06T 3/0006* (2013.01)

(56) References Cited

U.S. PATENT DOCUMENTS

| | | | |
|---|---|---|---|
| 2015/0161454 A1* | 6/2015 | Han | G06K 9/00798 382/104 |
| 2015/0279106 A1* | 10/2015 | Blanchflower | A63F 13/50 345/2.2 |
| 2016/0210339 A1* | 7/2016 | Kozakura | G06F 40/205 |

FOREIGN PATENT DOCUMENTS

| | | |
|---|---|---|
| CN | 103577488 A | 2/2014 |
| CN | 103886314 A | 6/2014 |
| CN | 104239898 A | 12/2014 |
| CN | 106547867 A | 3/2017 |
| CN | 107291855 A | 10/2017 |

OTHER PUBLICATIONS

Search Report issued in connection with corresponding Chinese Patent Application No. 201810274877.8.
Duan, Jia-xu et al., "Random sampling consensus-based and feature-based image registration," China Academic Electronic Journal Publishing House, 2017.
Wang, Zhenhai, "Trademark retrieval by combining HU invariant moments with SIFT features," Computer Engineering and Applications, 2012, 48(1), pp. 187-190.
Office Action dated Dec. 18, 2018 in connection with corresponding Chinese Patent Application No. 201810274877.8.
Song, Jiaqian, "Research and Realization of Video Image Mosaic Optimization Algorithm", China excellent full-text database master degree theses of master of information technology logic Chapter II, III, Issue 1, Jan. 15, 2016.
Research of Face Recognition Based on SIFT Algorithm.
Xiang, Shi-tao, "Method of Fast Face Matching Based on Rotation Texture Invariant Model", Computer Engineering and Design, vol. 39, No. 3, Mar. 2018.

* cited by examiner

IMAGE RECOGNITION METHOD AND DEVICE

CROSS-REFERENCE TO RELATED APPLICATIONS

The present application claims the benefit of priority to Chinese patent application No. 201810274877.8, filed before the State Intellectual Property Office on Mar. 30, 2018, and entitled "Image recognition method and device", which is incorporated in the present application by reference in its entirety.

TECHNICAL FIELD

The disclosure relates to the technology of image processing, and more particularly, to an image recognition method and device.

BACKGROUND

With the image retrieval technology, it is possible to determine whether a target image includes one or more images in an image library. In the mage retrieval technology, two steps are included: off-line training step and on-line retrieval step. In the off-line training step, at least one visual feature of each of the images in the image library is extracted to form an image feature index library. In the on-line retrieval step, the at least one visual feature of the target image is extracted and compared with that of each of images in the image feature index library to determine, from the image library, one or more reference images with a high similarity to the target image. In a case that each of the one or more reference images as determined has a similarity that is greater than a threshold with the target image, the target image may be considered to include the one or more reference images.

According to the entity for implementing the image retrieval technology, there may be cloud image retrieval and local image retrieval. In the cloud image retrieval, the target image is uploaded to the cloud, an image feature of the target image is compared with that of an image in the image library in the cloud, and a comparing result is transmitted to a mobile terminal. In the local image retrieval, firstly a feature library of a reference image data set is transmitted from the cloud to the mobile terminal, and the feature comparing is performed on the mobile terminal to obtain a comparing result.

In a case that illumination conditions are changed, an image is blurred due to the quick movement of a mobile terminal, or an effective object has a small occupation in the target image, the recognition accuracy of the existing image retrieval technology would be low, and a recognition error often occurs, which seriously affects the user experience.

SUMMARY

An image recognition method and device are provided according to embodiments of the present disclosure, so as to solve one or more technical problems in the related art.

In a first aspect, an embodiment of the present disclosure provides an image recognition method, including:

obtaining a target image, and extracting at least one first visual feature of the target image, wherein the first visual feature comprises a global visual feature and/or a local visual feature;

obtaining at least one pending image according to the first visual feature of the target image, and extracting a plurality of second visual features of the target image and the plurality of second visual features of the pending image, wherein the second visual feature is a local visual feature;

for each pending image, forming a plurality of visual feature pairs, wherein each visual feature pair comprises one of second visual features of the target image and a respective second visual feature of the pending image; and removing an unavailable visual feature pair from the plurality of visual feature pairs, to obtain at least one remaining feature pair; and determining an image similar to the target image from the at least one pending image, according to the at least one remaining feature pair.

In combination with the first aspect, in a first implementation of the first aspect of the embodiment of the present disclosure, said the obtaining of at least one pending image includes:

establishing an image feature index library according to first visual features of reference images in a reference image database; and retrieving the at least one pending image comprising the first visual feature of the target image from the image feature index library.

In combination with the first implementation of the first aspect, in a second implementation of the first aspect of the embodiment of the present disclosure, the at least one first visual feature comprises a local visual feature; and the retrieving the at least one pending image comprising the first visual feature of the target image from the image feature index library includes:

determining a visual word of the target image according to the local visual feature;

retrieving, from the image feature index library a plurality of images with the visual word of the target image, as candidate images;

forming a candidate image set with the candidate images;

determining a visual feature distance between the first visual feature of the target image and the first visual feature of each of candidate images, wherein the visual feature distance represents a similarity between the target image and the candidate image; and ranking the plurality of candidate images according to the visual feature distances, to determine at least one pending image from the candidate image set.

In combination with the first aspect, the first implementation of the first aspect, or the second implementation of the first aspect, in a third implementation of the first aspect of the embodiment of the present disclosure, said forming a plurality of visual feature pairs includes:

calculating a distance between the one of second visual features of the target image and the respective second visual feature of the pending image, and forming a plurality of visual feature pairs according to the distances, wherein the distance represents a similarity of the one of second visual features of the target image and the respective second visual feature of the pending image.

In combination with the third implementation of the first aspect, in a fourth implementation of the first aspect of the embodiment of the present disclosure, said removing an unavailable visual feature pair from the plurality of visual feature pairs to obtain at least one remaining feature pair includes:

verifying the plurality of visual feature pairs by Hough voting to remove the unavailable visual feature pair, to obtain at least one remaining feature pair.

In combination with the third implementation of the first aspect, in a fifth implementation of the first aspect of the embodiment of the present disclosure, said determining an image similar to the target image from the at least one pending image, according to the at least one remaining feature pair includes:

determining the image similar to the target image from the at least one pending image, according to the number of the at least one remaining feature pair; or calculating an affine transformation result between the target image and each pending image according to the at least one remaining feature pair, and determining the image similar to the target image from the at least one pending image according to the affine transformation result.

In combination with the fifth implementation of the first aspect, in a sixth implementation of the first aspect of the embodiment of the present disclosure, said calculating an affine transformation result between the target image and each pending image according to the at least one remaining feature pair includes:

calculating the affine transformation result between the one of second visual features of the target image and the respective second visual feature of the pending image in the at least one remaining feature pair, by means of random sample consensus.

In combination with the fifth implementation of the first aspect, in a seventh implementation of the first aspect of the embodiment of the present disclosure, said determining the image similar to the target image from the at least one pending image, according to the affine transformation result includes:

determining the image similar to the target image from the at least one pending image according to the number of inner group points obtained according to the affine transformation result; or determining the image similar to the target image from the at least one pending image according to a deviation of the affine transformation result between the target image and respective pending image.

In a second aspect, an embodiment of the present disclosure provides a control method for augmented reality, including:

determining an image similar to a target image from at least one pending image according to any one of the embodiments of the present disclosure; and obtaining animation and interaction process of a corresponding augmented reality case according to the determined image.

In a third aspect, an embodiment of the present disclosure provides an image recognition device, including:

an first obtaining module, configured for obtaining a target image, and extracting at least one first visual feature of the target image, wherein the first visual feature comprises a global visual feature and/or a local visual feature;

a second obtaining module, configured for obtaining at least one pending image according to the first visual feature of the target image, and extracting a plurality of second visual features of the target image and the plurality of second visual features of the pending image, wherein the second visual feature is a local visual feature;

a removing module, configured for, for each pending image, forming a plurality of visual feature pairs, wherein each visual feature pair comprises one of second visual features of the target image and a respective second visual feature of the pending image; and removing an unavailable visual feature pair from the plurality of visual feature pairs, to obtain at least one remaining feature pair; and a determining module, configured for determining an image similar to the target image from the at least one pending image, according to the at least one remaining feature pair.

In combination with the third aspect, in a first implementation of the third aspect of the embodiment of the present disclosure, the second obtaining module includes:

an establishing sub-module, configured for establishing an image feature index library according to first visual features of reference images in a reference image database; and a retrieving sub-module, configured for retrieving the at least one pending image comprising the first visual feature of the target image from the image feature index library.

In combination with the first implementation of the third aspect, in a second implementation of the third aspect of the embodiment of the present disclosure, the at least one first visual feature comprises a local visual feature; and the retrieving sub-module includes:

a visual word determining unit, configured for determining a visual word of the target image according to the local visual feature;

a candidate image retrieving unit, configured for retrieving, from the image feature index library a plurality of images with the visual word of the target image, as candidate images;

a forming unit, configured for forming a candidate image set with the candidate images;

a distance determining unit, configured for determining a visual feature distance between the first visual feature of the target image and the first visual feature of each of candidate images, wherein the visual feature distance represents a similarity between the target image and the candidate image; and a ranking unit, configured for ranking the plurality of candidate images according to the visual feature distances, to determine at least one pending image from the candidate image set.

In combination with the third aspect, the first implementation of the third aspect, or the second implementation of the third aspect, in a third implementation of the third aspect of the embodiment of the present disclosure, the second obtaining module is further configured for calculating a distance between the one of second visual features of the target image and the respective second visual feature of the pending image, and forming a plurality of visual feature pairs according to the distances, wherein the distance represents a similarity of the one of second visual features of the target image and the respective second visual feature of the pending image In combination with the third implementation of the third aspect, in a fourth implementation of the third aspect of the embodiment of the present disclosure, the removing module is further configured for verifying the plurality of visual feature pairs by Hough voting to remove the unavailable visual feature pair, to obtain at least one remaining feature pair.

In combination with the third implementation of the third aspect, in a fifth implementation of the third aspect of the embodiment of the present disclosure, the determining module is further configured for determining the image similar to the target image from the at least one pending image, according to the number of the at least one remaining feature pair; or calculating an affine transformation result between the target image and each pending image according to the at least one remaining feature pair, and determining the image similar to the target image from the at least one pending image according to the affine transformation result.

In combination with the fifth implementation of the third aspect, in a sixth implementation of the third aspect of the embodiment of the present disclosure, the determining module is further configured for calculating the affine transformation result between the one of second visual features of the target image and the respective second visual feature of the pending image in the at least one remaining feature pair, by means of random sample consensus.

In combination with the fifth implementation of the third aspect, in a seventh implementation of the third aspect of the embodiment of the present disclosure, the determining module is further configured for determining the image similar to the target image from the at least one pending image according to the number of inner group points obtained according to the affine transformation result; or determining the image similar to the target image from the at least one pending image according to a deviation of the affine transformation result between the target image and respective pending image.

In a fourth aspect, an embodiment of the present disclosure provides a control device for augmented reality, including: an image recognition device having a structure according to any of the embodiments of the present disclosure;

the control device for augmented reality further includes:

an augmented reality module configured for obtaining animation and interaction process of a corresponding augmented reality case according to the determined image.

In a fifth aspect, an embodiment of the present disclosure provides an image recognition device, including:

one or more processors; and a storage device for storing one or more programs;

when the one or more programs is executed by the one or more processors, the one or more processors implements the method according to any of the embodiments of the present disclosure.

In a sixth aspect, an embodiment of the present disclosure provides a computer readable storage medium having a computer program stored thereon that, when executed by a processor, implements the method according to any of the embodiments of the present disclosure.

One of the above-described technical solutions has the following advantages or advantageous effects: in the image recognition process, it is possible to determine whether a pending image obtained is similar to the target, and a method for removing an unavailable visual feature pair is performed, which is more accuracy than an image retrieval method, thus reducing misrecognition.

Another of the above-described technical solutions has the following advantages or advantageous effects: if applied to the augmented reality technology, the an initial pose for the tracking phase of the real-time augmented reality technology may be provided, which is advantageous for improving the overall accuracy of the augmented reality technology and provides better user experience.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

Figure 1:
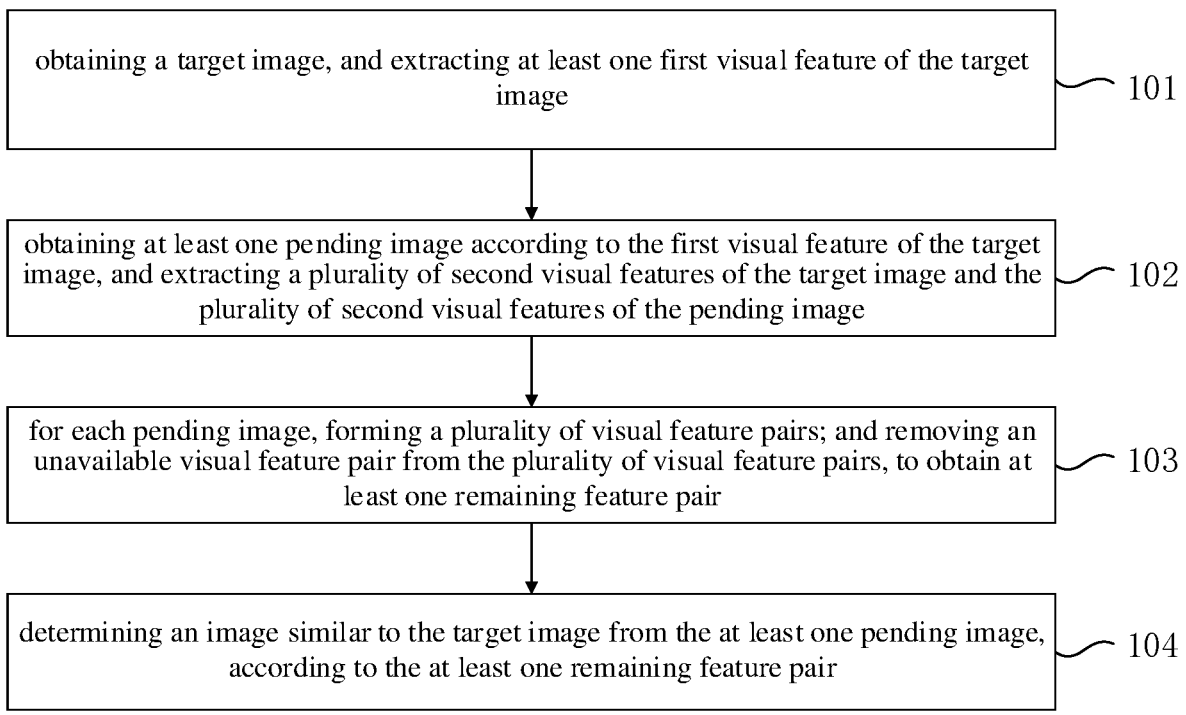
FIG. 1 shows a flowchart of an image recognition method according to an embodiment of the present disclosure.

FIG. 1 shows a flowchart of an image recognition method according to an embodiment of the present disclosure. As shown in FIG. 1, the image recognition method includes:

101: obtaining a target image, and extracting at least one first visual feature of the target image, wherein the first visual feature comprises a global visual feature and/or a local visual feature;

102: obtaining at least one pending image according to the first visual feature of the target image, and extracting a plurality of second visual features of the target image and the plurality of second visual features of the pending image, wherein the second visual feature is a local visual feature;

103: for each pending image, forming a plurality of visual feature pairs, wherein each visual feature pair comprises one of second visual features of the target image and a respective second visual feature of the pending image; and removing an unavailable visual feature pair from the plurality of visual feature pairs, to obtain at least one remaining feature pair; and 104: determining an image similar to the target image from the at least one pending image, according to the at least one remaining feature pair.

In an embodiment of the present disclosure, an image retrieval technology may be used to firstly retrieve one or more pending images according to the first visual feature of the target image from reference images in a reference image database. Then, it is determined whether one of the pending images is similar to the target image. During the determining, for each pending image, a distance between one of a plurality of second visual features of the target image and the respective second visual feature of the pending image may be calculated, and a plurality of visual feature pairs are formed by the plurality of second visual features with a distance smaller than a threshold. An unavailable visual feature pair is then removed from the plurality of visual feature pairs to obtain at least one remaining feature pair, and, based on the at least one remaining pair, it is determined that the pending image is similar to the. In this way, one or more pending images may be determined to be similar to the target image.

Herein, the first visual feature may be a global visual feature describing the visual content of the whole image, or may be a local visual feature describing part of the visual content of an image. The global visual feature that may be used as the first visual feature includes, but is not limited to, any one of a BoW (Bag of Words) feature, a VLAD (Vector of Locally Aggregated Descriptor) feature and an FV (Fisher Vector) feature; the local visual feature that may be used as the first visual feature is at least one or any combination of an SIFT (Scale-invariant Feature Transform) and an SURF (Speeded Up Robust Feature).

The second visual feature may be a local visual feature. The local visual feature that may be used as the second visual feature may a binarized visual features that is more lightweight, such as any of an ORB (Oriented FAST and Rotated BRIEF) feature or an FREAK (Fast Retina Keypoint) feature.

A distance between two visual features may be calculated by a certain calculating method. The smaller the distance between the two visual features is, the higher the similarity between the two corresponding images is.

The image recognition method according to this embodiment may be performed either in a cloud or at a terminal.

In one example, the step of obtaining at least one pending image according to the first visual feature of the target image may be executed in a server in the cloud or at a terminal. The execution in the cloud is faster and more efficient.

In another example, the steps regarding the second visual features may be executed in the server in the cloud or at the terminal. As compared with the number of reference images in the reference image database, that of the pending images is smaller, requiring a lower processing capacity of the device, and thus fast processing may also be realized at the terminal.

In another example, if the pending images are obtained in the cloud according to the first visual feature of the target image, the pending images may be transmitted to the terminal by the cloud, and the steps regarding the second visual features may be performed at the terminal. In this way, the processing requiring a high processing capacity of the device may be assigned to the cloud, and the processing requiring a low processing capacity of the device may be assigned to the terminal, thereby taking advantage of computing resources more reasonably.

In the image recognition method according to the embodiment of the present disclosure, the determining of an image similar to the target image may be performed to the pending images obtained by the image retrieval, and for the determining of an image similar to the target image, an unavailable visual feature pair may be removed, thus improving the accuracy of image recognition and reducing recognition errors. In a case that illumination conditions are changed, an image is blurred due to the quick movement of a mobile terminal, or an effective object has a small occupation in the target image, it is still possible to accurately determine, from the pending images, an image similar to the target image.

Figure 2:
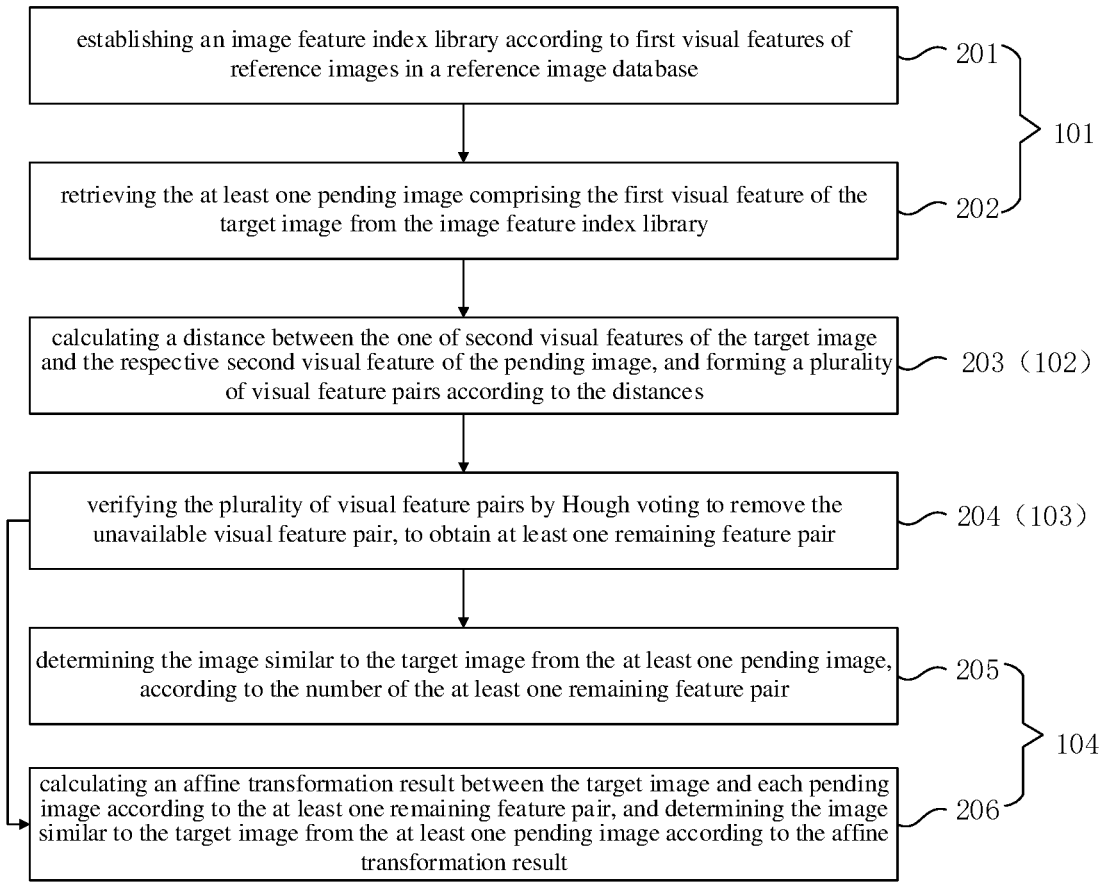
FIG. 2 shows a flowchart of an image recognition method according to another embodiment of the present disclosure.

FIG. 2 shows a flowchart of an image recognition method according to another embodiment of the present disclosure. As shown in FIG. 2, this method differs from that of the above embodiment in that Step 101 of this method may include:

201: establishing an image feature index library according to first visual features of reference images in a reference image database; and 202: retrieving the at least one pending image comprising the first visual feature of the target image from the image feature index library.

In a possible implementation, step 202 includes: in a case that the at least one first visual feature comprises a local visual feature, determining a visual word of the target image according to the local visual feature, wherein the visual word may a clustering center obtained by clustering a plurality of consecutive local visual features in the target image; retrieving, from the image feature index library a plurality of images with the visual word of the target image, as candidate images; and forming a candidate image set with the candidate images; determining a visual feature distance between the first visual feature of the target image and the first visual feature of each of candidate images, wherein the visual feature distance represents a similarity between the target image and the candidate image; ranking the plurality of candidate images according to the visual feature distances, to determine at least one pending image from the candidate image set.

The image feature index library may include index structural information and the respective first visual features of a plurality of images, so as to facilitate the image retrieval. For example, the index structure of the image feature index library may be an inverted index. In an inverted index established for the respective first visual features of the reference images in the reference image database, images containing an identical visual word may be grouped into the same index item, and one image may appear in more than one index item. The inverted index is only an example, and the image feature index library may be established in other manners, such as in a layered inverted index, which are not limited in this embodiment.

After determining the visual word of the target image according to the local visual feature, it is possible to perform retrieving in an index containing the visual word of the target image in the image feature index library and according to the inverted index of the image feature index library, wherein each index may correspond to one or more image. Images corresponding to the index containing the visual word of the target image may be used to form a candidate image set. Then, the visual feature distance between the first visual feature of the target image and the first visual feature of each of candidate images is determined, so as to determine a similarity between the target image and each of candidate images. Finally, according to the visual feature distance as determined, the candidate images are ranked in a certain order, for example, in an order from small to large in distance. One or more candidate images, for example, with the smallest or second small distance, are selected from the candidate images as one or more pending images with the highest similarity to the target image.

An example is described below. In the example, the target image includes visual words A and B. In the image feature index library, there are two entries in the index corresponding to the visual word A, images P1 and P2 respectively, and there is one entry in the index corresponding to the visual word B, image P3. If the at least one first visual feature contains only one global visual feature, the first visual feature distances are the distances between the first visual feature of the target image and the respective first visual features of P1, P2, P3. If the at least one first visual feature includes a plurality of local visual features, the first visual feature distances between the target image and respective P1, P2, P3 are the numbers of the remaining feature pairs of respective P1, P2, P3. If the at least one first visual features include both a global visual feature and a local visual feature, the visual feature distance for the global visual feature, or the visual feature distance for the local visual feature, or a distance obtained by weighting the global visual feature and the local visual feature may be used as the first visual feature distance. If one or more of the first visual feature distances between the target image and respective P1, P2, P3 are less than a certain threshold, one or more of P1, P2, and P3 are considered to be the pending images.

In one possible implementation, the plurality of second visual features of the target image include a plurality of local visual features, and Step 102 may include:

203: calculating a distance between the one of second visual features of the target image and the respective second visual feature of the pending image, and forming a plurality of visual feature pairs according to the distances.

In one implementation, distances between one local visual feature of the target image and respective local visual features of the pending image can be calculated, and a local visual feature of the pending image with the smallest distance with the one local visual feature of the target image is selected to form a local visual feature pair with the one local visual feature of the target image.

In another implementation, distances between one local visual feature of the target image and respective local visual features of the pending image can be calculated. A ratio of the smallest distance and the second smallest distance is calculated. If the ratio is less than a preset threshold, the local visual feature of the pending image with the smallest distance with the one local visual feature of the target image is selected to form a local visual feature pair with the one local visual feature of the target image. If the ratio is greater than or equal to the preset threshold, it is determined that the pending image contains no feature that may be used to form a local visual feature pair with the one local visual feature of the target image.

An example is described below. In the example, the plurality of local visual features of the target image include F1 and F2, the plurality of local visual features of the pending image S1 include F3 and F4, and the plurality of local visual features of the pending image S2 include F5 and F6. The distance between one of the local visual features of the target image and the respective second visual feature of one of the pending images is calculated. If the distance between the feature F1 and the feature F3 of the pending image S1 is the smallest, a local visual feature pair is formed by the feature F1 and the feature F3. If the distance between the feature F1 of the target image and the feature F5 of the pending image S2 is the smallest, a local visual feature pair is formed by the feature F1 and the feature F5. Also, if the distance between the feature F2 of the target image and the feature F6 of the pending image S2 is the smallest, a local visual feature pair is formed by the feature F2 and the feature F6 form, and so on.

In the above example, for the pending image S1, if the distance L1 between the feature F1 and the feature F3 is the smallest distance, and the distance L2 between the feature F1 and the feature F4 is the second smallest distance, the ratio of L1 to L2 may be further calculated. If the ratio is less than a certain threshold, which means that L1 is much smaller than L2, the feature F3 is selected to form a local visual feature pair with the feature F1. If the ratio of L1 to L2 is close to 1, there may be no feature in the pending image S1 to form a local visual feature pair with the feature F1.

For example, a method for calculating the distance between two visual features may be Euclidean distance, cosine distance, or Hamming distance. For the visual features obtained by different algorithms, a suitable method for calculating the distance may be used. For example, a Hamming distance is used for an ORB/FREAK feature, and an Euclidean distance is used for an SIFT feature.

In one possible implementation, step 103 may include:

204: verifying the plurality of visual feature pairs by Hough voting to remove the unavailable visual feature pair, to obtain at least one remaining feature pair.

In one example, in the Hough Voting, a parameter space of the Hough voting may be constructed by four degrees of freedom: plane displacement, rotation, zooming in, and zooming out.

In one possible implementation, step 104 may include 205 or 206:

205: determining the image similar to the target image from the at least one pending image, according to the number of the at least one remaining feature pair.

For example, if the number of the at least one remaining feature pair is less than a certain threshold, it indicates that there is no image, in the pending images, similar to the target image; if the number of the at least one remaining feature pair is greater than or equal to the threshold, it indicates that there is an image, in the pending images, similar to the target image.

206: calculating an affine transformation result between the target image and each pending image according to the at least one remaining feature pair, and determining the image similar to the target image from the at least one pending image according to the affine transformation result.

In one possible implementation, the calculating an affine transformation result between the target image and each pending image according to the at least one remaining feature pair includes:

calculating the affine transformation result between the one of second visual features of the target image and the respective second visual feature of the pending image in the at least one remaining feature pair, by means of random sample consensus (RANSAC).

In one possible implementation, the determining the image similar to the target image from the at least one pending image, according to the affine transformation result includes:

determining the image similar to the target image from the at least one pending image according to the number of inner group points obtained according to the affine transformation result; or determining the image similar to the target image from the at least one pending image according to a deviation of the affine transformation result between the target image and respective pending image.

In this embodiment, based on the affine transformation result, it may be determined whether there is an image, in the pending images, similar to the target image. For example, after calculating the number of inner group points, if the number of the inner group points is less than a certain threshold, it indicates that there is no image, in the pending images, similar to the target image, and otherwise it indicates that there is an image, in the pending images, similar to the target image.

For another example, a deviation of the affine transformation result between the target image and respective pending image is calculated. If the deviation is greater than a certain threshold, it indicates that there is no image, in the pending images, similar to the target image, otherwise it indicates that there is an image, in the pending images, similar to the target image.

Figure 3:
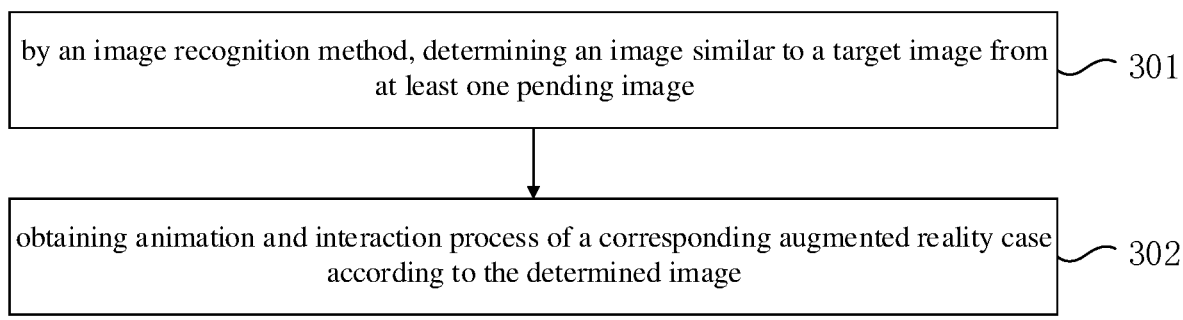
FIG. 3 shows a flowchart of a control method for augmented reality according to an embodiment of the present disclosure.

FIG. 3 shows a flowchart of a control method for augmented reality according to an embodiment of the present disclosure. As shown in FIG. 3, the method includes:

301: by any one of the image recognition methods according to the above embodiments, determining an image similar to a target image from at least one pending image; and

302: obtaining animation and interaction process of a corresponding augmented reality case according to the determined image.

In the image recognition method according to the embodiments of the present disclosure, the determining of an image similar to the target image may be performed to the pending images obtained by the image retrieval, and for the determining of an image similar to the target image, an unavailable visual feature pair may be removed, thus improving the accuracy of image recognition and reducing recognition errors. If the above technical solutions are applied to the augmented reality technology, an initial pose may be provided in the tracking phase of the real-time augmented reality technology, which is advantageous for improving the accuracy of the augmented reality technology and provides better user experience.

For example, image recognition may be used in the triggering phase of augmented reality. The server may transmit a tracking model and a rendering model corresponding to the result of the image retrieval to a mobile terminal, and real-time tracking phase may be performed in the mobile terminal. If the server transmits the tracking model and the rendering model corresponding to the result of the recognition to the mobile terminal, it is possible to reduce the possibility of transmitting an incorrect tracking model and rendering model to the mobile terminal, thus ensuring that the mobile terminal performs tracking and rendering correctly.

Figure 4:
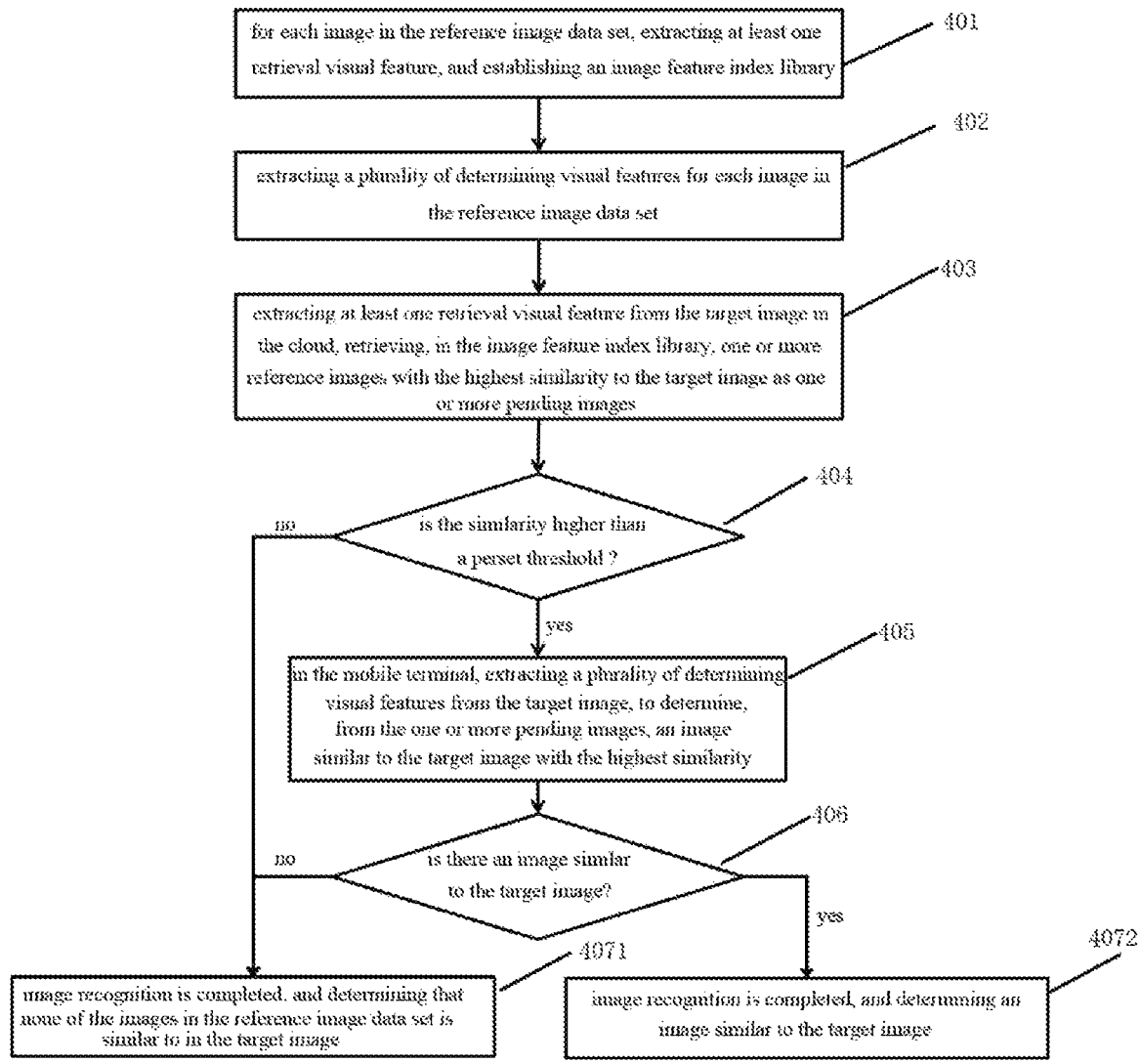
FIG. 4 shows a flowchart of an image recognition method according to further another embodiment of the present disclosure.

FIG. 4 shows a flowchart of an image recognition method according to another embodiment of the present disclosure. This embodiment is a specific example of the image recognition method of the above embodiment. In this embodiment, the reference image database may be also referred to as a reference image data set, the first visual feature may be referred to as a retrieval visual feature, the second visual feature may be referred to as a determining visual feature, and the image feature index library may be also referred to as an image retrieval index library, a retrieval feature index library, a target visual feature library, or the like.

Referring to FIG. 4, the image recognition method includes:

401: for each image in the reference image data set, extracting at least one retrieval visual feature, and establishing an image feature index library.

For example, the "retrieval visual feature" includes a set of numbers that describe visual content of the entire image, and a distance between two retrieval visual features may be calculated by a certain calculating method. The smaller the distance between the two retrieval visual features is, the higher the visual similarity of the two corresponding images will be.

The "image feature index library" includes a collection of retrieval visual features of a plurality of images and index structure information, so as to accelerate the process of image retrieval.

Optionally, the retrieval visual feature may be any global visual feature that describes the visual content of the entire image, which is generally obtained by combining a plurality of local visual features describing part of the visual content in an image, and exhibits a statistical distribution of the local visual features in a visual dictionary. For example, the retrieval visual feature may be a word bag model feature, a VLAD feature, an FV feature, etc.

Optionally, a local visual features for obtaining a global visual feature may be any local visual feature for describing part of the visual content of an image, such as an SIFT, an SURF, etc.

Optionally, a method of forming the visual dictionary includes: clustering a plurality of consecutive local visual features to obtain a fixed number of discrete cluster centers, each of which is referred to as a visual word, and forming a visual dictionary by the visual words.

Optionally, depending on a global visual feature being a set of floating point type numeric values or binary numeric values, a method for calculating a distance between two global visual features may be used, such as the Euclidean distance, the cosine distance, the Hamming distance and the like.

Optionally, an index for the retrieval visual features in the reference image data set may be established as an inverted index. In an index library, images containing an identical visual word are grouped into the same one index, and an image may present in multiple indexes. In order to improve the availability of global visual features in a large-scale reference image data set, the visual dictionary is required to contain a large number of visual words, which, however, will reduce the retrieval efficiency when using the index library. In order to solve this problem, a visual feature index may be established as a layered inverted index, to improve the retrieval efficiency in the visual dictionary including large amount of data.

402: extracting a plurality of determining visual features for each image in the reference image data set.

For example, a "determining visual feature" may include a plurality of local visual features. The local visual feature include a set of numbers describing the visual content of part of an image, and a distance between two local visual features may be calculated by a certain calculating method. The smaller the distance between two local visual features is, the more similar the visual contents of the two corresponding parts will be. This step may also be executed in the cloud, and step 405 is executed at the terminal.

As compared to a local visual feature in the retrieval visual feature, a local visual feature in the determining visual feature may be a binarized visual feature that is more lightweight, such as an ORB (Oriented FAST and Rotated BRIEF) feature, an FREAK (Fast Retina Keypoint) feature, etc. A determining visual feature may be considered to be a feature more lightweight than a retrieval visual feature, in a case that the determining visual feature, compared to the retrieval visual feature, satisfies at least one of small amount of data, short calculation time and low calculation complexity.

Optionally, the distance between binarized local visual features may be calculated using a calculating method such as Hamming distance.

403: extracting at least one retrieval visual feature from the target image in the cloud, retrieving, in the image feature index library, one or more reference images with the highest similarity to the target image as one or more pending images.

Optionally, the retrieving in the image feature index library may include: obtaining a set of visual words contained in the target image. According to the inverted index structure, an image containing these visual words in the reference image database is determined to be a candidate image, and a candidate image set may be formed by at least one candidate image. A distance between the retrieval visual feature of the target image and that of a candidate image is calculated.

Optionally, the distance between the retrieval visual features may be the distance between a global visual feature of a candidate image and that of the target image, or a combination of the distances between one of local visual features for combining a global visual feature of a candidate image and that of the target image.

Optionally, the at least one candidate image is ranked in an order from small to large in distance as obtained between the retrieval visual features. One or more candidate images ranking the highest may be used as one or more pending images with the highest similarity to the target image.

404: for the one or more pending images obtained in 403, in a case that the retrieval visual feature distance between a pending image and the target image is less than a preset threshold, proceeding to 405; otherwise, proceeding to 4071 in which it is determined that none of the images in the reference image data set is similar to the target image.

405: in the mobile terminal, extracting a plurality of determining visual features from the target image, to determine, from the one or more pending images, an image similar to the target image with the highest similarity, wherein the "determining visual feature" is that described in 402.

Optionally, determining an image similar to the target image may include: for each pending image, calculating a distance between one of local visual features of the target image and the respective local visual feature of the pending image, to form a plurality of local visual feature pairs according to the calculated distances; verifying the local visual feature pairs to remove an unavailable visual feature pair, to obtain at least one remaining feature pair; and calculating an affine transformation result between target image and each pending image according to at least one remaining feature pairs.

Optionally, the Hough voting may be used to remove an unavailable visual feature pair, wherein a parameter space of the Hough voting may be constructed by four degrees of freedom: plane displacement, rotation, zooming in and zooming out.

Optionally, an affine transformation result may be calculated with a random sample consensus method.

Optionally, 405 may be executed for multiple rounds to improve accuracy of the determining.

406: determining an image similar to the target image from the one pending image by performing 405; in a case that there is no image similar to the target image, proceeding to 4071, which indicates that none of the images in the reference image data set presents in the target image; and in a case that there is an image similar to the target image, determining that the image presents in the target image.

It is determined that there is no image similar to the target in a case that: the number of the remaining feature pairs after removing an unavailable feature pair in 405 is less than a certain threshold; or the number of inner group points after calculating the affine transformation result between each pending image and the target image in 405 is less than a certain threshold, or a deviation of the affine transformation result is greater than a certain threshold.

In this embodiment, image retrieval technology in the cloud and image determining at local are both used to perform recognition to the target image and determine whether it contains one or more images in the reference image data set, which greatly improves recognition accuracy as compared with solutions in the related art.

The technical solution of this embodiment may be applied to a target triggering phase in a two-dimensional augmented reality technology to improve an accuracy of the target triggering and is beneficial to implement subsequent phases.

Figure 5:
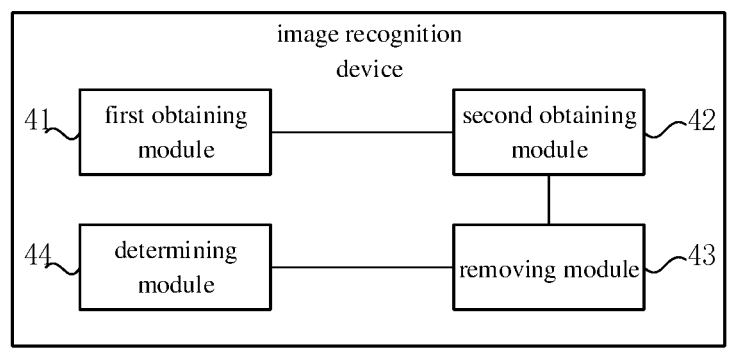
FIG. 5 is a structure block diagram of an image recognition device according to an embodiment of the present disclosure.

FIG. 5 is a structure block diagram of an image recognition device according to an embodiment of the present disclosure. As shown in FIG. 5, the image recognition device may include:

an first obtaining module 41, configured for obtaining a target image, and extracting at least one first visual feature of the target image, wherein the first visual feature comprises a global visual feature and/or a local visual feature;

a second obtaining module 42, configured for obtaining at least one pending image according to the first visual feature of the target image, and extracting a plurality of second visual features of the target image and the plurality of second visual features of the pending image, wherein the second visual feature is a local visual feature;

a removing module 43, configured for, for each pending image, forming a plurality of visual feature pairs, wherein each visual feature pair comprises one of second visual features of the target image and a respective second visual feature of the pending image; and removing an unavailable visual feature pair from the plurality of visual feature pairs, to obtain at least one remaining feature pair; and a determining module 44, configured for determining an image similar to the target image from the at least one pending image, according to the at least one remaining feature pair.

Figures 6, 7:
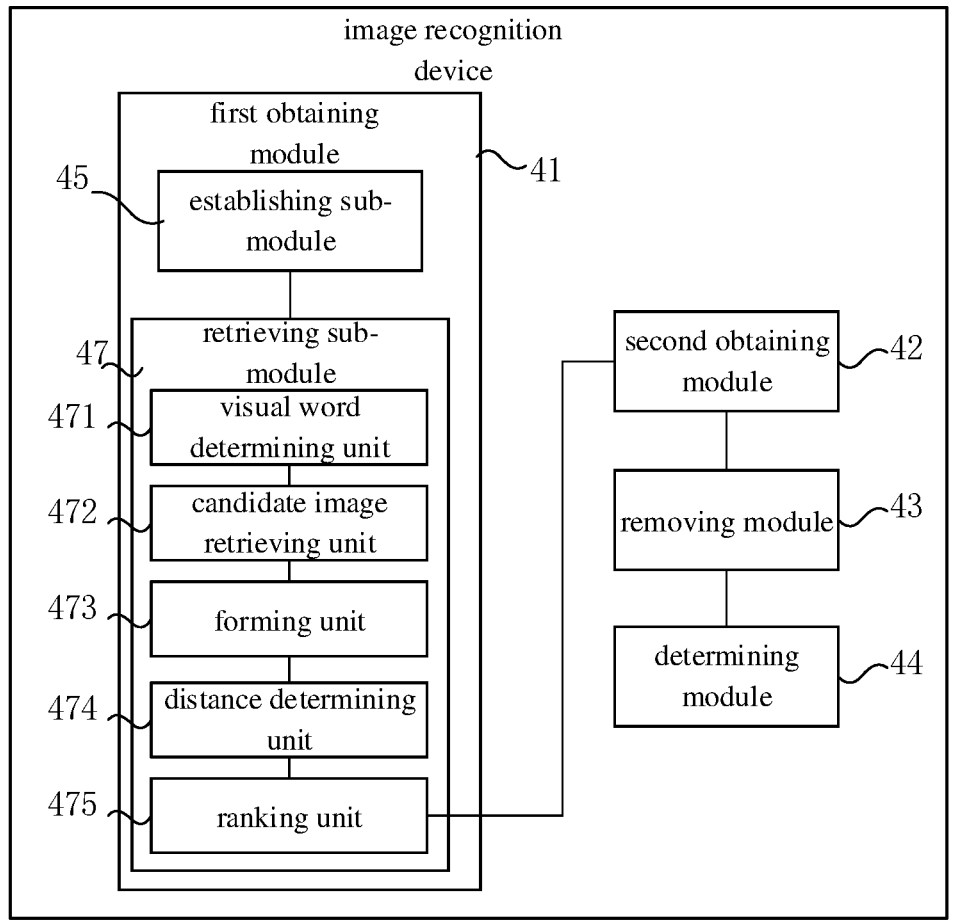
FIG. 6 is another structure block diagram of an image recognition device according to an embodiment of the present disclosure.
FIG. 7 is a structure block diagram of a control device for augmented reality according to an embodiment of the present disclosure.

In one possible implementation, as shown in FIG. 6, the second obtaining module 41 includes:

an establishing sub-module 45, configured for establishing an image feature index library according to first visual features of reference images in a reference image database; and a retrieving sub-module 47, configured for retrieving the at least one pending image comprising the first visual feature of the target image from the image feature index library.

In one possible implementation, the at least one first visual feature comprises a local visual feature; and the retrieving sub-module 47 includes:

a visual word determining unit 471, configured for determining a visual word of the target image according to the local visual feature;

a candidate image retrieving unit 472, configured for retrieving, from the image feature index library a plurality of images with the visual word of the target image, as candidate images;

a forming unit 473, configured for forming a candidate image set with the candidate images;

a distance determining unit 474, configured for determining a visual feature distance between the first visual feature of the target image and the first visual feature of each of candidate images, wherein the visual feature distance represents a similarity between the target image and the candidate image; and a ranking unit 475, configured for ranking the plurality of candidate images according to the visual feature distances, to determine at least one pending image from the candidate image set.

In one possible implementation, the second obtaining module 42 is further configured for calculating a distance between the one of second visual features of the target image and the respective second visual feature of the pending image, and forming a plurality of visual feature pairs according to the distances, wherein the distance represents a similarity of the one of second visual features of the target image and the respective second visual feature of the pending image.

In one possible implementation, the removing module 43 is further configured for verifying the plurality of visual feature pairs by Hough voting to remove the unavailable visual feature pair, to obtain at least one remaining feature pair.

In one possible implementation, the determining module 44 is further configured for determining the image similar to the target image from the at least one pending image, according to the number of the at least one remaining feature pair; or calculating an affine transformation result between the target image and each pending image according to the at least one remaining feature pair, and determining the image similar to the target image from the at least one pending image according to the affine transformation result.

In one possible implementation, the determining module 44 is further configured for calculating the affine transformation result between the one of second visual features of the target image and the respective second visual feature of the pending image in the at least one remaining feature pair, by means of random sample consensus.

In one possible implementation, the determining module 44 is further configured for determining the image similar to the target image from the at least one pending image according to the number of inner group points obtained according to the affine transformation result; or determining the image similar to the target image from the at least one pending image according to a deviation of the affine transformation result between the target image and respective pending image.

FIG. 7 is a structure block diagram of a control device for augmented reality according to an embodiment of the present disclosure. As shown in FIG. 7, the control device for augmented reality includes: an image recognition device 71 having a structure according to any of the above embodiments;

the control device for augmented reality further includes:

an augmented reality module 73 configured for obtaining animation and interaction process of a corresponding augmented reality case according to the determined image.

Figure 8:
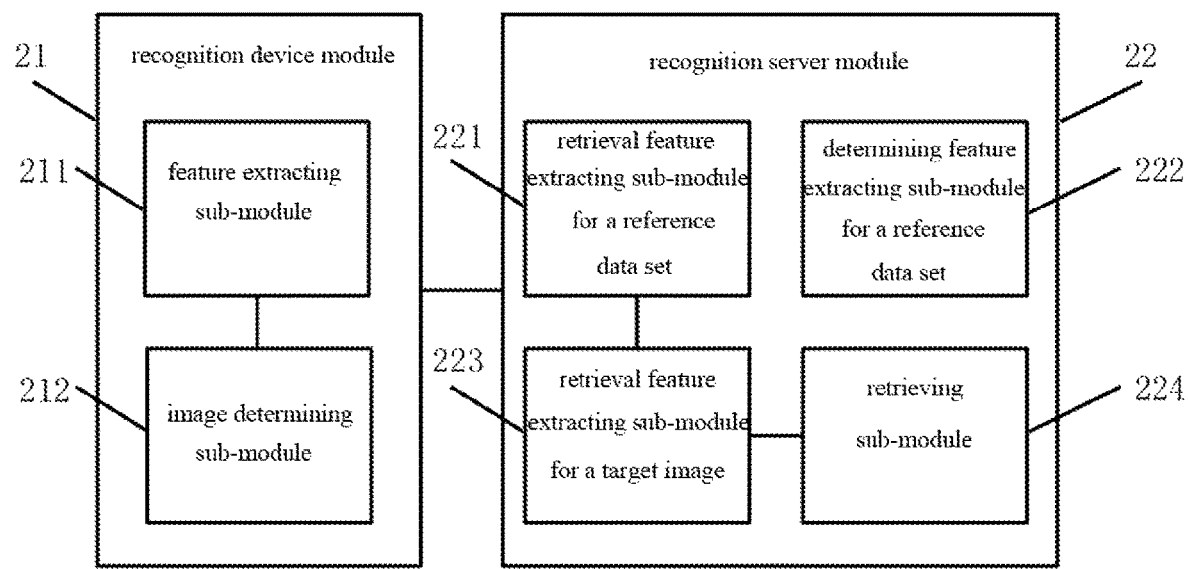
FIG. 8 is a structure block diagram of an image recognition device according to another embodiment of the present disclosure.

FIG. 8 is a structure block diagram of an image recognition device according to another embodiment of the present disclosure. Referring to FIG. 8, the image recognition device may include a recognition device module 21 and a recognition server module 22.

The recognition device module 21 calls a feature extracting sub-module 211 and an image determining sub-module 212 configured respectively to extract the determining features of the target image and to determine an image similar to the target image, respectively.

The recognition server module 22 calls a retrieval feature extracting sub-module 221 for a reference data set, a determining feature extracting sub-module 222 for a reference data set, a retrieval feature extracting sub-module 223 for a target image, and a retrieving sub-module 224, which are configured, respectively, to extract retrieval features and establish an index for the reference data set, to extract determining features for the reference data set, to extract retrieval features for the target image, and to perform retrieval, according to the target image, in the reference data set. The sub-modules 221 and 222 are required to be called only once when the reference data set is established or updated.

An embodiment of the present disclosure provides an image recognition device. As shown in FIG. 7, the image recognition device includes a memory 310 and a processor 320. A computer program that can run on the processor 320 is stored in the memory 310. When the processor 320 executes the computer program, the method in the above embodiment is implemented. The number the memory 310 and the processor 320 may each be one or more.

The image recognition device also includes:

a communication interface 330, configured to communicate with an external device to perform data interaction and transmission.

The memory 310 may include a high-speed RAM memory, or may also include a non-volatile memory, such as at least one disk memory.

Figure 9:
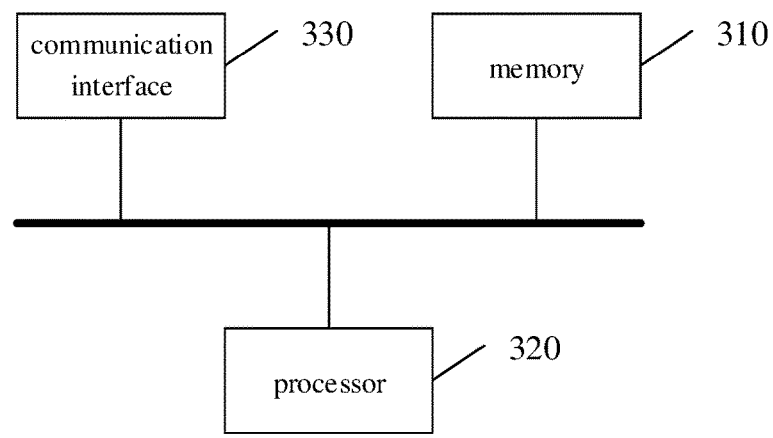
FIG. 9 is a structure block diagram of an image recognition device according to further another embodiment of the present disclosure.

If the memory 310, the processor 320 and the communication interface 330 are implemented independently, the memory 310, the processor 320 and the communication interface 330 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 9 to represent the bus, but it does not mean that there is only one bus or only one type of bus.

Optionally, in a specific implementation, if the memory 310, the processor 320 and the communication interface 330 are integrated on one chip, then the memory 310, the processor 320 and the communication interface 330 can complete mutual communication through an internal interface.

An embodiment of the present disclosure provides a computer readable storage medium having a computer program stored thereon that, when executed by a processor, implements the method as described in any of the above embodiments.

For the functions of various modules in the device according to the embodiment of the disclosure, reference may be made to relevant description of the above method, and a repeated description is omitted herein.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer-readable storage medium include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. An image recognition method, comprising:
   obtaining a target image, and extracting at least one first visual feature of the target image, wherein the first visual feature comprises a global visual feature and/or a local visual feature;
   obtaining at least one pending image according to the first visual feature of the target image, and extracting a plurality of second visual features of the target image and the plurality of second visual features of the pending image, wherein the second visual feature is a local visual feature, wherein each second visual feature contains less amount of data than the first visual feature;
   for each pending image, forming a plurality of visual feature pairs, wherein each visual feature pair comprises one of second visual features of the target image and a respective second visual feature of the pending image; and removing an unavailable visual feature pair from the plurality of visual feature pairs, to obtain at least one remaining feature pair; and
   determining an image similar to the target image from the at least one pending image, according to the at least one remaining feature pair obtained for each pending image.

2. The method of claim 1, wherein the obtaining of at least one pending image comprises:
   establishing an image feature index library according to first visual features of reference images in a reference image database; and
   retrieving the at least one pending image comprising the first visual feature of the target image from the image feature index library.

3. The method of claim 2, wherein the at least one first visual feature comprises a local visual feature; and
   the retrieving the at least one pending image comprising the first visual feature of the target image from the image feature index library comprises:
   determining a visual word of the target image according to the local visual feature;

retrieving, from the image feature index library a plurality of images with the visual word of the target image, as candidate images;

forming a candidate image set with the candidate images;

determining a visual feature distance between the first visual feature of the target image and the first visual feature of each of candidate images, wherein the visual feature distance represents a similarity between the target image and the candidate image; and ranking the plurality of candidate images according to the visual feature distances, to determine at least one pending image from the candidate image set.

4. The method of claim 1, wherein the forming a plurality of visual feature pairs comprises:

calculating a distance between the one of second visual features of the target image and the respective second visual feature of the pending image, and forming a plurality of visual feature pairs according to the distances, wherein the distance represents a similarity of the one of second visual features of the target image and the respective second visual feature of the pending image.

5. The method of claim 4, wherein the removing an unavailable visual feature pair from the plurality of visual feature pairs to obtain at least one remaining feature pair comprises:

verifying the plurality of visual feature pairs by Hough voting to remove the unavailable visual feature pair, to obtain at least one remaining feature pair.

6. The method of claim 4, wherein the determining an image similar to the target image from the at least one pending image, according to the at least one remaining feature pair comprises:

determining the image similar to the target image from the at least one pending image, according to the number of the at least one remaining feature pair; or calculating an affine transformation result between the target image and each pending image according to the at least one remaining feature pair, and determining the image similar to the target image from the at least one pending image according to the affine transformation result.

7. The method of claim 6, wherein the calculating an affine transformation result between the target image and each pending image according to the at least one remaining feature pair comprises:

calculating the affine transformation result between the one of second visual features of the target image and the respective second visual feature of the pending image in the at least one remaining feature pair, by means of random sample consensus.

8. The method of claim 6, wherein the determining the image similar to the target image from the at least one pending image, according to the affine transformation result comprises:

determining the image similar to the target image from the at least one pending image according to the number of inner group points obtained according to the affine transformation result; or determining the image similar to the target image from the at least one pending image according to a deviation of the affine transformation result between the target image and respective pending image.

9. A control method for augmented reality, comprising:

determining an image similar to a target image from at least one pending image by the image recognition method according to claim 1; and obtaining animation and interaction process of a corresponding augmented reality case according to the determined image.

10. An image recognition device, the device comprising:

one or more processors; and a storage device configured to store one or more programs, wherein the one or more programs, when executed by the one or more processors, cause the one or more processors to:

obtain a target image, and extract at least one first visual feature of the target image, wherein the first visual feature comprises a global visual feature and/or a local visual feature;

obtain at least one pending image according to the first visual feature of the target image, and extract a plurality of second visual features of the target image and the plurality of second visual features of the pending image, wherein the second visual feature is a local visual feature, wherein each second visual feature contains less amount of data than the first visual feature;

for each pending image, form a plurality of visual feature pairs, wherein each visual feature pair comprises one of second visual features of the target image and a respective second visual feature of the pending image; and remove an unavailable visual feature pair from the plurality of visual feature pairs, to obtain at least one remaining feature pair; and determine an image similar to the target image from the at least one pending image, according to the at least one remaining feature pair obtained for each pending image.

11. The device of claim 10, wherein the one or more programs, when executed by the one or more processors, cause the one or more processors further to:

establish an image feature index library according to first visual features of reference images in a reference image database; and retrieve the at least one pending image comprising the first visual feature of the target image from the image feature index library.

12. The device of claim 11, wherein the at least one first visual feature comprises a local visual feature; and the one or more programs, when executed by the one or more processors, cause the one or more processors further to:

determine a visual word of the target image according to the local visual feature;

retrieve, from the image feature index library a plurality of images with the visual word of the target image, as candidate images;

form a candidate image set with the candidate images;

determine a visual feature distance between the first visual feature of the target image and the first visual feature of each of candidate images, wherein the visual feature distance represents a similarity between the target image and the candidate image; and rank the plurality of candidate images according to the visual feature distances, to determine at least one pending image from the candidate image set.

13. The device of claim 10, wherein the one or more programs, when executed by the one or more processors, cause the one or more processors further to:

calculate a distance between the one of second visual features of the target image and the respective second visual feature of the pending image, and form a plurality of visual feature pairs according to the distances, wherein the distance represents a similarity of the one of second visual features of the target image and the respective second visual feature of the pending image.

14. The device of claim 13, wherein the one or more programs, when executed by the one or more processors, cause the one or more processors further to:
verify the plurality of visual feature pairs by Hough voting to remove the unavailable visual feature pair, to obtain at least one remaining feature pair.

15. The device of claim 13, wherein the one or more programs, when executed by the one or more processors, cause the one or more processors further to:
determine the image similar to the target image from the at least one pending image, according to the number of the at least one remaining feature pair; or
calculate an affine transformation result between the target image and each pending image according to the at least one remaining feature pair, and determining the image similar to the target image from the at least one pending image according to the affine transformation result.

16. The device of claim 15, wherein the one or more programs, when executed by the one or more processors, cause the one or more processors further to:
calculate the affine transformation result between the one of second visual features of the target image and the respective second visual feature of the pending image in the at least one remaining feature pair, by means of random sample consensus.

17. The device of claim 15, wherein the one or more programs, when executed by the one or more processors, cause the one or more processors further to:
determine the image similar to the target image from the at least one pending image according to the number of inner group points obtained according to the affine transformation result; or
determine the image similar to the target image from the at least one pending image according to a deviation of the affine transformation result between the target image and respective pending image.

18. A control device for augmented reality, the device comprising an image recognition device of claim 10;
the control device for augmented reality further comprises:
an augmented reality module configured.

19. A non-volatile computer readable storage medium having a computer program stored thereon that, when executed by a processor, implements the method of claim 1.

* * * * *